(12) United States Patent
Little et al.

(10) Patent No.: US 8,303,322 B1
(45) Date of Patent: Nov. 6, 2012

(54) CARD CONNECTOR ANTI-MISINSERTING A MICRO SD CARD

(75) Inventors: Terrance F. Little, York, PA (US); Stephen Sedio, Valley Center, CA (US)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 0 days.

(21) Appl. No.: 13/174,877

(22) Filed: Jul. 1, 2011

(51) Int. Cl.
*H01R 13/62* (2006.01)
(52) U.S. Cl. ....................................................... 439/159
(58) Field of Classification Search .................. 439/159, 439/630, 160, 633
See application file for complete search history.

(56) References Cited

U.S. PATENT DOCUMENTS

| | | | | |
|---|---|---|---|---|
| 7,142,229 B2 * | 11/2006 | Ohkubo et al. | ............... | 347/238 |
| 7,165,997 B1 * | 1/2007 | Hou | ............................... | 439/630 |
| 7,314,390 B1 * | 1/2008 | Lai et al. | ........................ | 439/630 |
| 7,632,117 B1 * | 12/2009 | Van der Steen | ............... | 439/159 |
| 7,780,476 B2 * | 8/2010 | Sun et al. | ....................... | 439/630 |
| 7,819,678 B2 * | 10/2010 | Ye et al. | .......................... | 439/159 |
| 7,901,225 B2 * | 3/2011 | Maruyama | ..................... | 439/159 |
| 7,927,117 B2 * | 4/2011 | Yu et al. | ......................... | 439/159 |
| 2010/0087074 A1 | 4/2010 | Yu et al. | | |

\* cited by examiner

*Primary Examiner* — Phuong Dinh
(74) *Attorney, Agent, or Firm* — Ming Chieh Chang; Wei Te Chung

(57) ABSTRACT

A card connector (100) used for receiving an inserted card (5), defining a card receiving space and a card insertion/ejection direction, includes an insulative housing (2), a number of contacts (3) retained in the insulative housing, a metal shell (7) covering the insulative housing, a slider (41) assembled on the insulative housing, and a spring (42) compressed between the insulative housing and the slider for urging the slider along the card ejection direction. The metal shell includes a flexible beam (711) extending towards the card receiving space and a holding portion (712) at the free end of the flexible beam. The slider has a notch (413) releasably engaged with the holding portion. The slider is moveable relative to the insulative housing along the card insertion direction in response to a separation of the holding portion from the notch.

6 Claims, 8 Drawing Sheets

& emsp;US 8,303,322 B1

CARD CONNECTOR ANTI-MISINSERTING A MICRO SD CARD

CROSS-REFERENCE TO RELATED APPLICATIONS

This patent application relates to a U.S. patent application Ser. No. 13/158,505, filed on 2011, Jun. 13, entitled "CARD CONNECTOR WITH REAR LATCH", and another U.S. patent application Ser. No. 13/174,866 filed on 2011, Jul. 1 entitled "CARD CONNECTOR ANTI-MISINSERTING A MICRO SD CARD", both of which are assigned to the same assignee as this application.

BACKGROUND OF THE INVENTION

1. Field of the Invention

The present invention relates generally to a card connector, and more particularly to a card connector which has anti-misinsert feature for preventing insertion of a micro SD (Security Digital) card.

2. Description of Related Arts

Micro SD (Security Digital) card standard is published by SD association. A micro SD card usually defines a side notch and a micro SD card connector is used for receiving the micro SD card. The micro SD card connector usually has an ejector comprising a slider, a spring, and a pin member for cooperatively ejecting the micro SD card. The micro SD card connector further comprises a card lock separately or integrally formed with the slider for securing with the side notch of the micro SD card. Presently, JEDEC (Joint Electronic Device Engineering Council) association is establishing a new UFS (Universal Flash Storage) card standard aiming at developing a faster memory card. Therefore, a card connector having a new card lock different from that of micro SD card connector and more particularly, a card connector which has anti-misinsert feature for a micro SD (Security Digital) card is desired.

Hence, a new card connector is desired.

SUMMARY OF THE INVENTION

Accordingly, an object of the present invention is to provide a card connector which has anti-misinsert feature for preventing insertion of a micro SD card.

To achieve the above object, a card connector used for receiving an inserted card, defining a card receiving space and a card insertion/ejection direction, includes an insulative housing, a number of contacts retained in the insulative housing, a metal shell covering the insulative housing, a slider assembled on the insulative housing, and a spring compressed between the insulative housing and the slider for urging the slider along the card ejection direction. The metal shell includes a flexible beam extending towards the card receiving space and a holding portion at the free end of the flexible beam. The slider has a notch releasably engaged with the holding portion. The slider is moveable relative to the insulative housing along the card insertion direction in response to a separation of the holding portion from the notch.

Other objects, advantages and novel features of the invention will become more apparent from the following detailed description when taken in conjunction with the accompanying drawings.

DETAILED DESCRIPTION OF THE PREFERRED EMBODIMENT

Figure 1:
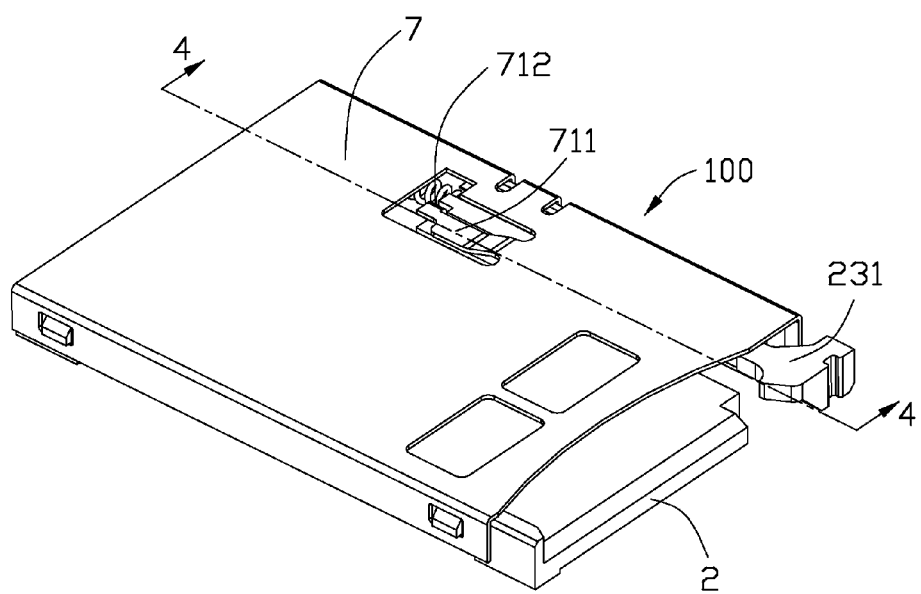
FIG. 1 is a perspective, assembled view of a card connector constructed in accordance with the present invention.

Reference will now be made in detail to the preferred embodiment of the present invention.

Referring to FIGS. 1-8, a card connector 100 in accordance with the present invention, used for receiving an inserted card, comprises an insulative housing 2, a plurality of contacts 3 received in the insulative housing 2 along a card insertion direction, a slider 41 assembled on the insulative housing 2, and a spring 42 sandwiched between the insulative housing 2 and the slider 41 for urging the slider 41 along a card ejection direction. The card connector 100 further comprises a metal shell 7 covering the insulative housing 2 for shielding. The inserted card is a UFS (Universal Flash Storage) card 5. A micro SD (Secure Digital) card 6 is prevented from being inserted into the card connector 100.

Figure 2:
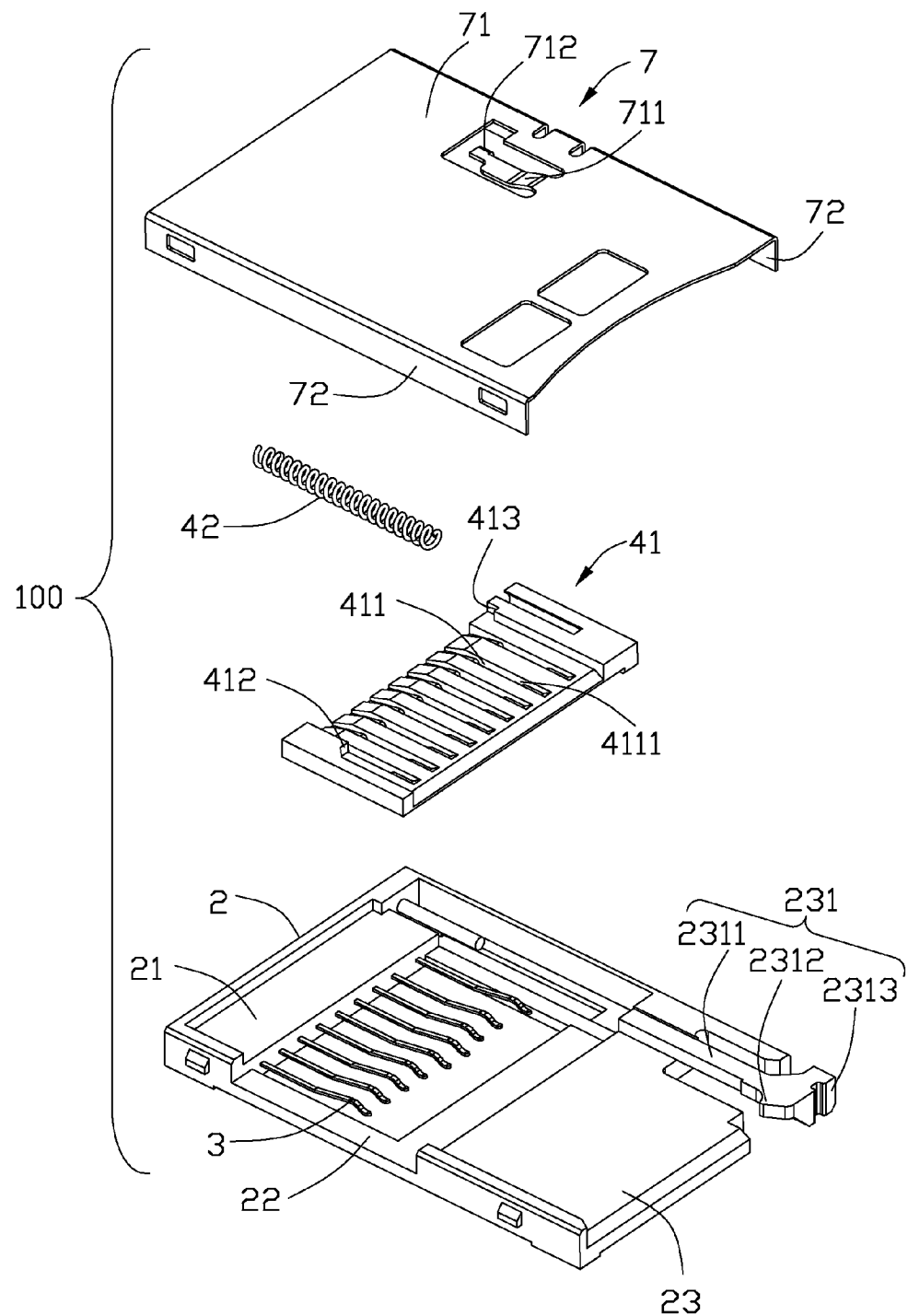
FIGS. 2 and 3 are perspective, exploded views of the card connector.
Figure 3:
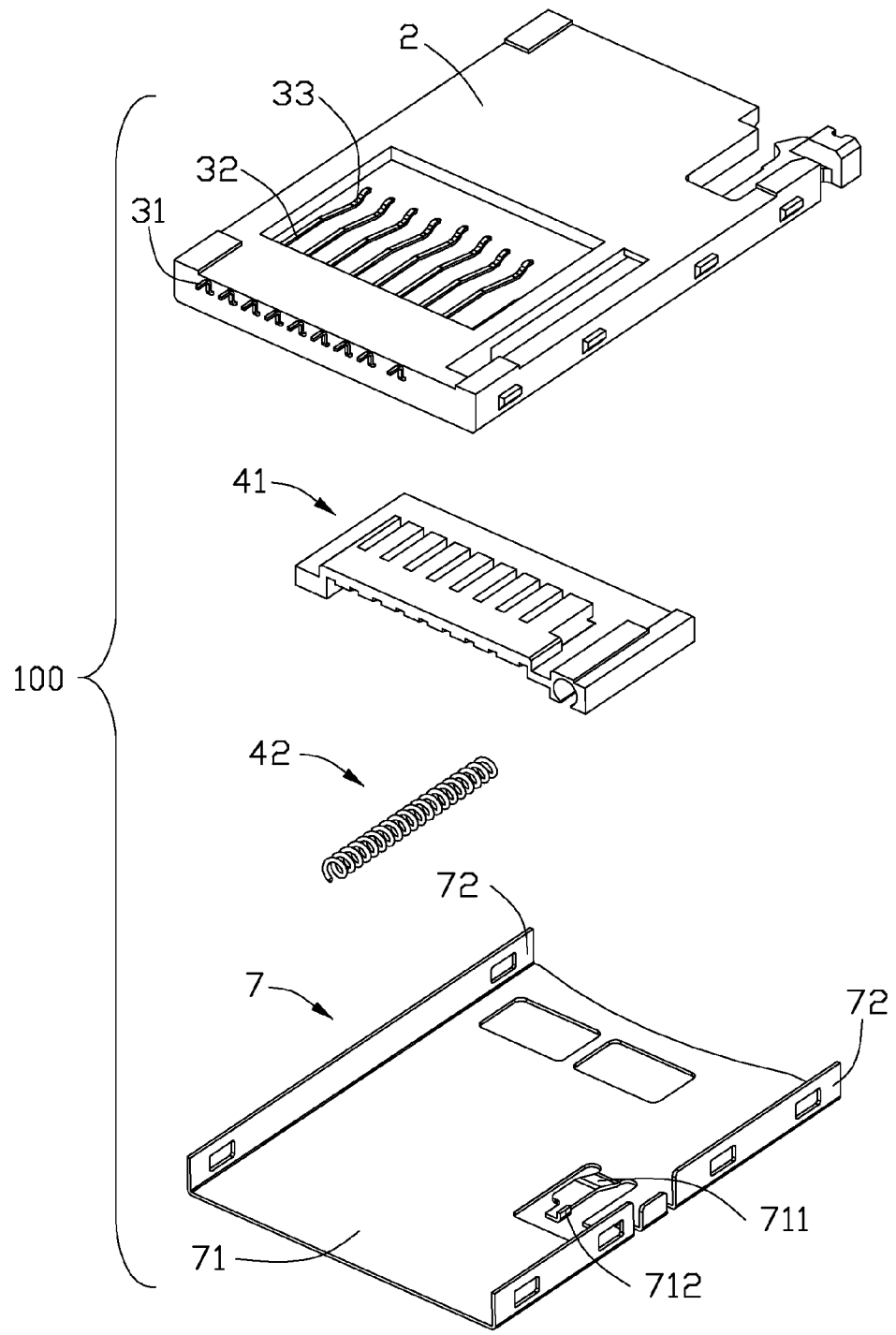

Referring to FIGS. 2 and 3, the insulative housing 2 comprises a front retaining portion 21, a middle supporting portion 22, and a rear securing portion 23 positioned along the card insertion/ejection direction. The contacts 3 have a plurality of soldering portions 31 extending out of the insulative housing 2, a plurality of connecting portions 32 retained in the retaining portion 21, and a plurality of contacting portions 33 extending rearward upwardly towards the supporting portion 22. The slider 41 is assembled on the supporting portion 22. The slider 41 and the insulative housing 2 together define a card receiving space (not labeled). The insulative housing 2 forms a rear latch 231 at a lateral side of the securing portion 23. The rear latch 231 comprises a flexible arm 2311 integral with the insulative housing 2, a card lock 2312 inwardly formed at the free end of the flexible arm 2311, and an operating portion 2313 formed at the free end of the flexible arm 2311 which is opposite to the card lock 2312. The flexible arm 2311 abuts against the card receiving space and is deflectable away from the card receiving space when the card lock 2312 or the operating portion 2313 is pushed for giving away to the inserted card. The card lock 2312 protrudes towards the card receiving space and is capable of being secured with the inserted card.

Referring to FIGS. 2 and 3, the slider 41 is assembled between the supporting portion 22 and the securing portion 23 of the insulative housing 2. The slider 41 defines a plurality of recesses 411 on an upper surface thereof. The recesses 411 extend along the card insertion/ejection direction for receiving the corresponding contacting portions 33 of the contacts 3. The slider 41 forms a cam 4111 in each recess 411. The contacting portions 33 are raised upwardly into the card receiving space by the cams 4111 for connecting with the inserted card. The slider 41 comprises a confronting portion 412 at a front, left side thereof. The inserted card confronts with the confronting portion 412 for moving the slider 41 along the card insertion direction and the confronting portion 412 reversely pushes the inserted card 5 to move along the card ejection direction. During the movement of the slider 41 along the card insertion direction, the spring 42 is compressed to have elasticity. The elasticity of the spring 42 is released and therefore, the spring 42 urges the slider 41 to move along the card ejection direction. The slider 41 defines a notch 413 on an upper surface thereof, which is adjacent to the spring 42 and distal from the confronting portion 412. In a preferred embodiment, the rear latch 231 is essentially aligned with the spring 42 and the notch 413 along the card insertion/ejection direction.

Figure 4:
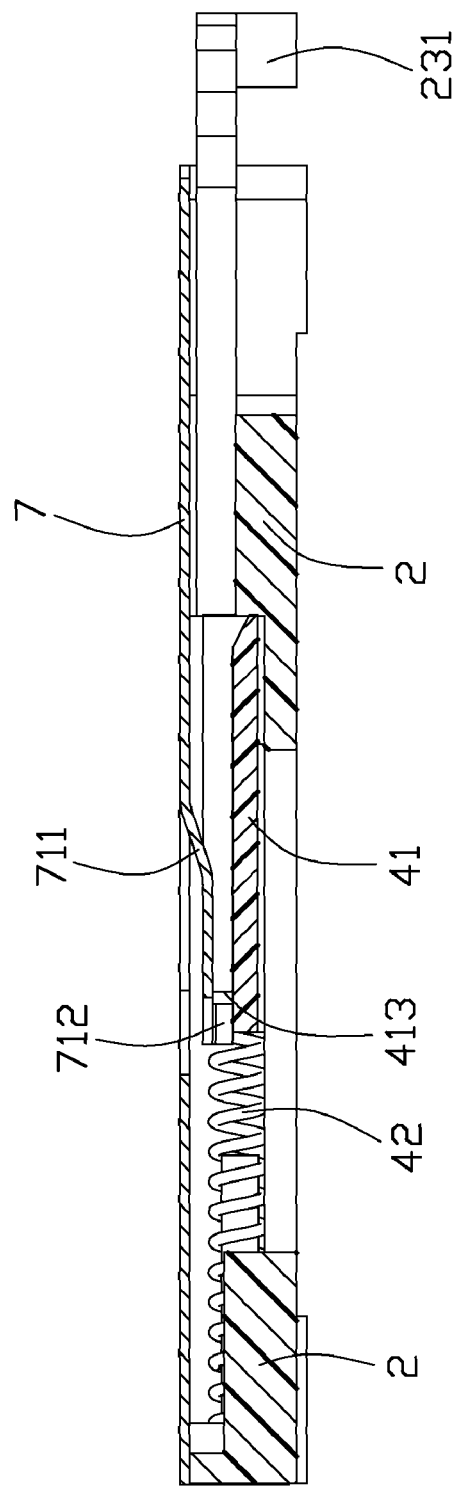
FIG. 4 is a first cross-sectional view of the card connector taken along line 4-4 of FIG. 1.

Referring to FIGS. 1-4, the metal shell 7 comprises a main plate 71 and a pair of sidewalls 72 extending vertically and downwardly from two opposite edges of the main plate 71. The main plate 71 is stamped to form a flexible beam 711 extending forwardly and downwardly towards the card receiving space and a holding portion 712 laterally at the free end of the flexible beam 711. When the card connector 100 is not in use, as shown in FIG. 4, the holding portion 712 is engaged with the notch 413 of the slider 41 such that the slider 41 is immoveable with respect to the insulative housing 1.

Figure 5:
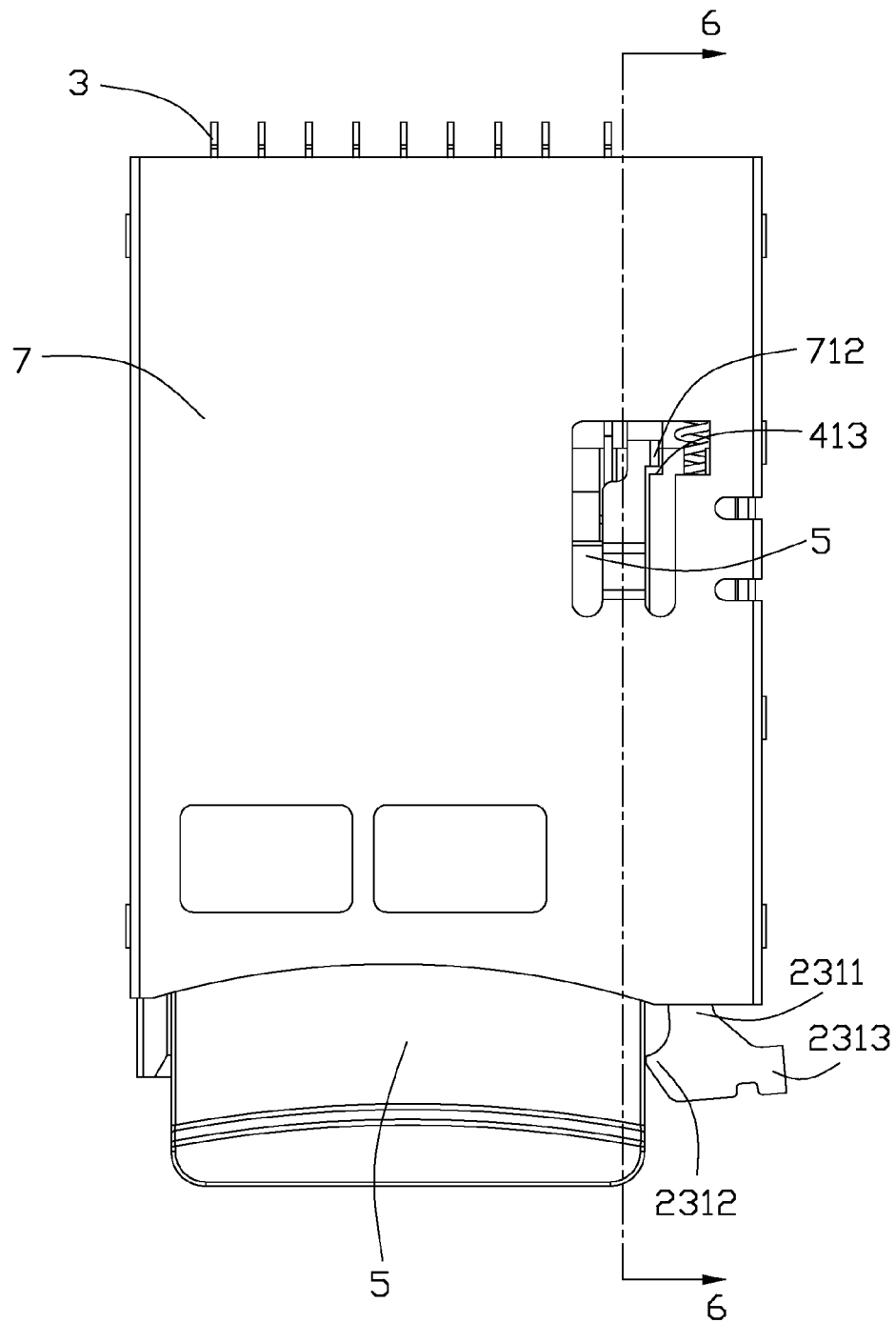
FIG. 5 is a top plan view of the card connector when a UFS card is initially inserted at which the front edge of the UFS card achieves at the confronting portion of the slider.
Figure 6:
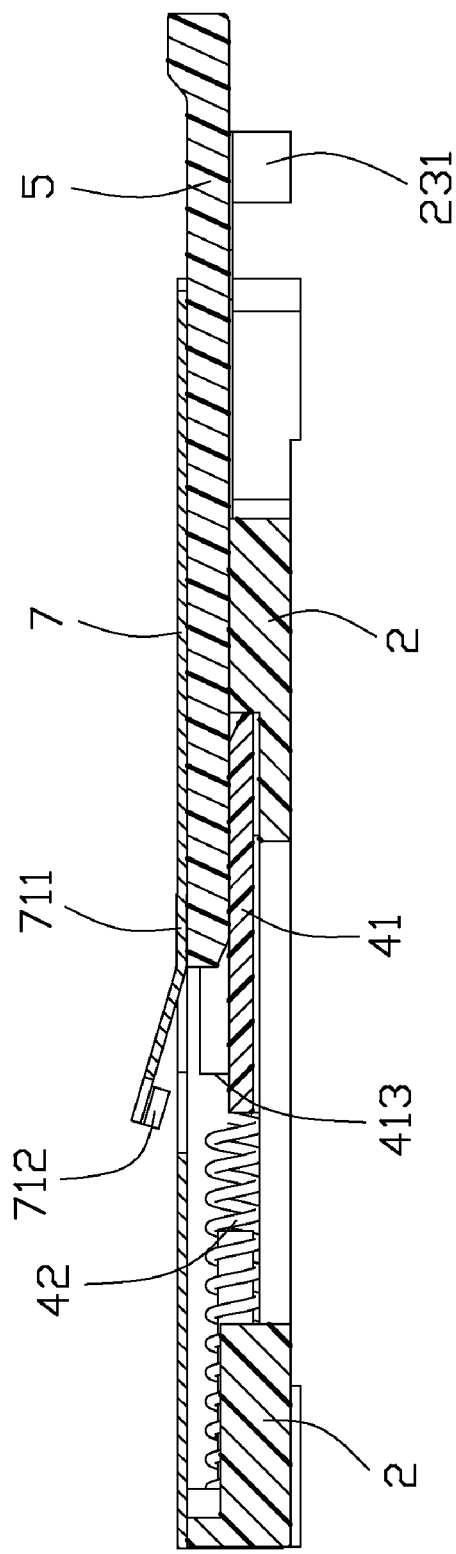
FIG. 6 is a second cross-sectional view of the card connector taken along line 6-6 of FIG. 5.

Referring to FIGS. 5 and 6, showing a state that the UFS card 5 is initially inserted into the card receiving space when the front edge of the UFS card 5 is orientated at the confronting portion 412 of the slider 41. When the UFS card 5 begins to be inserted into the card receiving space, the front edge of the UFS card 5 pushes the card lock 2312 outwardly and the flexible arm 2311 is deflected away from the card receiving space for giving away for the UFS card 5. When the UFS card 5 is inserted as FIG. 5, because the UFS card 5 has a larger width, the UFS card 5 conflicts the flexible beam 711 of the metal shell 7 and the holding portion 712 disengages the notch 413 of the slider 41 and therefore, the UFS card 5 begins to move the slider 41 along the card insertion direction. The spring 42 becomes compressed and has elasticity. When the UFS card 5 is fully inserted, the flexible arm 2311 returns back to its original position and the card lock 2312 is secured with the rear edge of the UFS card 5. During the UFS card's ejection, the flexible beam 711 of the metal shell 7 releases its elasticity and the holding portion 712 engages with the notch 413 of the slider 41 again. The slider 41 becomes immoveable with respect to the insulative housing 1 again.

Figure 7:
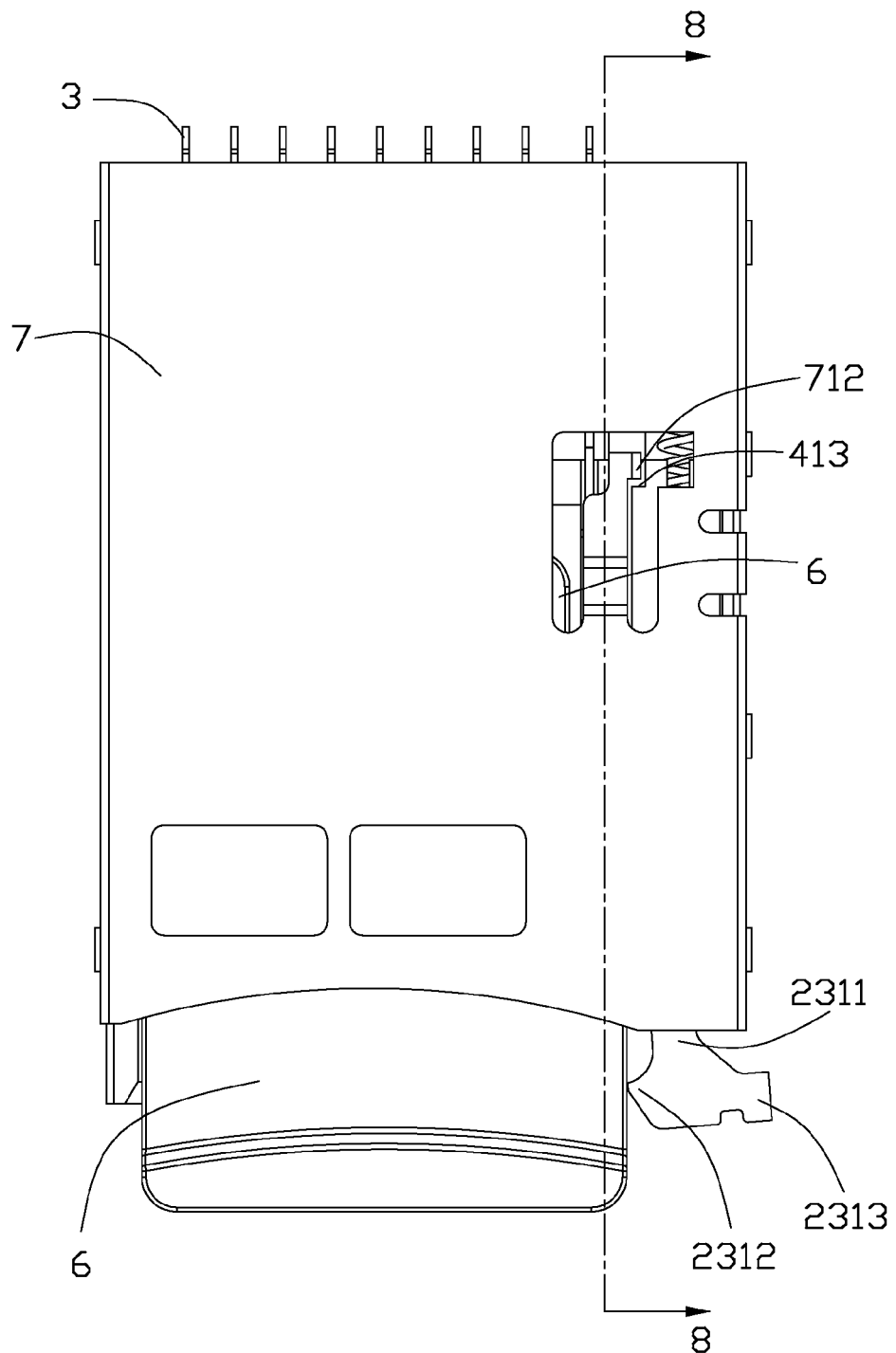
FIG. 7 is a top plan view of the card connector when a micro SD card is initially inserted at which the front edge of the micro SD card achieves at the confronting portion of the slider.
Figure 8:
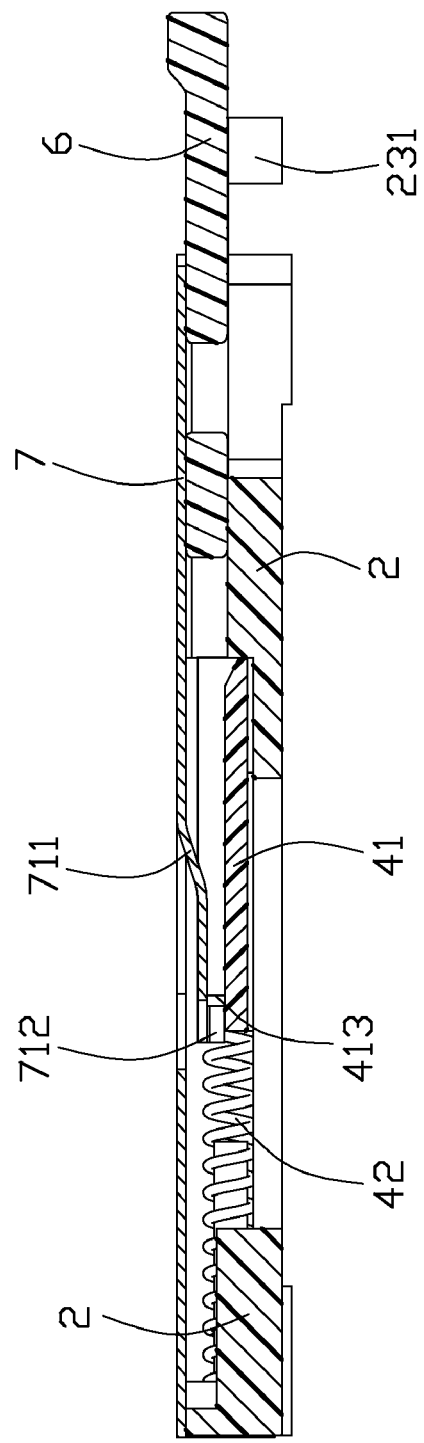
FIG. 8 is a third cross-sectional view of the card connector taken along line 8-8 of FIG. 7.

Referring to FIGS. 7 and 8, showing a state that the micro SD card 6 is initially inserted into the card receiving space when the front edge of the micro SD card 6 is orientated at the confronting portion 412 of the slider 41. Since the micro SD card 6 has a smaller front edge 61, the front part of the micro SD card 6 is smoothly inserted to the state of FIG. 7. When the micro SD card 6 is initially inserted as FIG. 7, the front edge 61 of the micro SD card 6 can not conflict the flexible beam 711 of the metal shell 7. Therefore, the slider 41 keeps engagement with the insulative housing 2. Even though the micro SD card 6 confronts the confronting portion 412 of the slider 41, the slider 41 is not driven by the micro SD card 6 to move along the card insertion direction.

In the card connector 100 of the present invention, the slider 41 is engaged with the metal shell 7. The slider 41 moves along the insulative housing 2 only under condition that the holding portion 712 is separated from the notch 413. The slider 41 is immovable relative to the insulative housing 2 if the holding portion 712 is not separated from the notch 413. Since the UFS card 5 has a larger width while the micro SD card 6 has a smaller front edge, the UFS card 5 could disengage the slider 41 from the metal shell 7, but the micro SD card 6 could not disengage the slider 41 from the metal shell 7. Thus, the card connector 100 is used for receiving the UFS card 5. The micro SD card 6 is prevented from being inserted into the card connector 100.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector used for receiving an inserted card, defining a card receiving space and a card insertion/ejection direction, comprising:
    an insulative housing;
    a plurality of contacts retained in the insulative housing;
    a metal shell covering the insulative housing, the metal shell comprising a flexible beam extending towards the card receiving space and a holding portion at the free end of the flexible beam;
    a slider assembled on the insulative housing and having a notch releasably engaged with the holding portion; and
    a spring compressed between the insulative housing and the slider for urging the slider along the card ejection direction; wherein
    the slider is moveable relative to the insulative housing along the card insertion direction in response to a separation of the holding portion from the notch, wherein the inserted card conflicts the flexible beam to disengage the holding portion away from the notch, wherein the notch is on an upper surface of the slider, wherein the notch is adjacent to the spring, wherein the slider comprises a confronting portion which the inserted card confronts with for pushing the slider along the card insertion direction and for the slider to push the inserted card out of the card receiving space along the card ejection direction, wherein the notch is distal from the confronting portion.

2. The card connector as claimed in claim 1, wherein the insulative housing comprises a rear latch for securing a rear edge of the inserted card.

3. The card connector as claimed in claim 2, wherein the inserted card is a UFS card.

4. The card connector as claimed in claim 2, wherein the rear latch comprises a flexible arm integral with the insulative housing, a card lock inwardly formed at the free end of the flexible arm, and an operating portion formed at the free end of the flexible arm.

5. The card connector as claimed in claim 2, wherein the rear latch is essentially aligned with the spring and the notch along the card insertion/ejection direction.

6. The card connector as claimed in claim 1, wherein the contacts are raised up into the card receiving space during a movement of the slider along the card insertion direction.

* * * * *